United States Patent
Matsumoto et al.

(10) Patent No.: US 7,772,522 B2
(45) Date of Patent: Aug. 10, 2010

(54) METHOD FOR SCRIBING SUBSTRATE OF BRITTLE MATERIAL AND SCRIBER

(75) Inventors: Masato Matsumoto, Osaka (JP); Tougo Gonoe, Osaka (JP)

(73) Assignee: Mitsuboshi Diamond Industrial Co., Ltd., Osaka (JP)

( * ) Notice: Subject to any disclaimer, the term of this patent is extended or adjusted under 35 U.S.C. 154(b) by 737 days.

(21) Appl. No.: 10/490,323

(22) PCT Filed: Sep. 20, 2002

(86) PCT No.: PCT/JP02/09742

§ 371 (c)(1),
(2), (4) Date: Aug. 30, 2004

(87) PCT Pub. No.: WO03/026861

PCT Pub. Date: Apr. 3, 2003

(65) Prior Publication Data

US 2005/0029239 A1      Feb. 10, 2005

(30) Foreign Application Priority Data

Sep. 21, 2001   (JP) .............................. 2001-289620

(51) Int. Cl.
   *B23K 26/00*   (2006.01)
(52) U.S. Cl. ................ 219/121.72; 219/121.67; 219/121.84; 219/121.76
(58) Field of Classification Search ............ 219/121.72, 219/121.67, 121.84, 121.68, 121.85, 121.76, 219/121.6
See application file for complete search history.

(56) References Cited

U.S. PATENT DOCUMENTS

| | | | | |
|---|---|---|---|---|
| 5,478,983 A | * | 12/1995 | Rancourt ................ | 219/121.63 |
| 6,211,488 B1 | * | 4/2001 | Hoekstra et al. ........ | 219/121.72 |
| 6,259,058 B1 | * | 7/2001 | Hoekstra ................ | 219/121.75 |
| 6,489,588 B1 | * | 12/2002 | Hoekstra et al. ........ | 219/121.67 |
| 6,501,047 B1 | * | 12/2002 | Xuan et al. ............. | 219/121.69 |
| 6,713,720 B2 | * | 3/2004 | Jeon et al. .............. | 219/121.72 |
| 2002/0046997 A1 | * | 4/2002 | Nam et al. ............. | 219/121.72 |

FOREIGN PATENT DOCUMENTS

| | | |
|---|---|---|
| JP | 2001-130921 | 5/2001 |
| JP | 2001130921 | 5/2001 |
| JP | 2002100590 | 4/2002 |
| JP | 2002346995 | 12/2002 |
| JP | 2002144067 | 5/2004 |

OTHER PUBLICATIONS

PCT/JP02/09742; International Search Report mailed Dec. 11, 2002.
European search report for corresponding application No. 02772886.4 issued Feb. 18, 2009.

* cited by examiner

*Primary Examiner*—M. Alexandra Elve
(74) *Attorney, Agent, or Firm*—Renner, Otto, Boisselle & Sklar, LLP

(57) ABSTRACT

A mother glass substrate is continuously heated by a first laser spot LS1 to a temperature which is lower than a softening point of the mother glass substrate, along a scribe line formation line SL on a surface of the mother glass substrate, along which a scribe line is to be formed, while an area close to the first laser spot LS1 is continuously cooled along the scribe line formation line SL; and an area which is close to the cooled area and is on an opposite side to the first laser spot LS1 is continuously heated by a second laser spot LS2 along the scribe line formation line SL to a temperature which is lower than the softening point of the mother glass substrate.

9 Claims, 9 Drawing Sheets

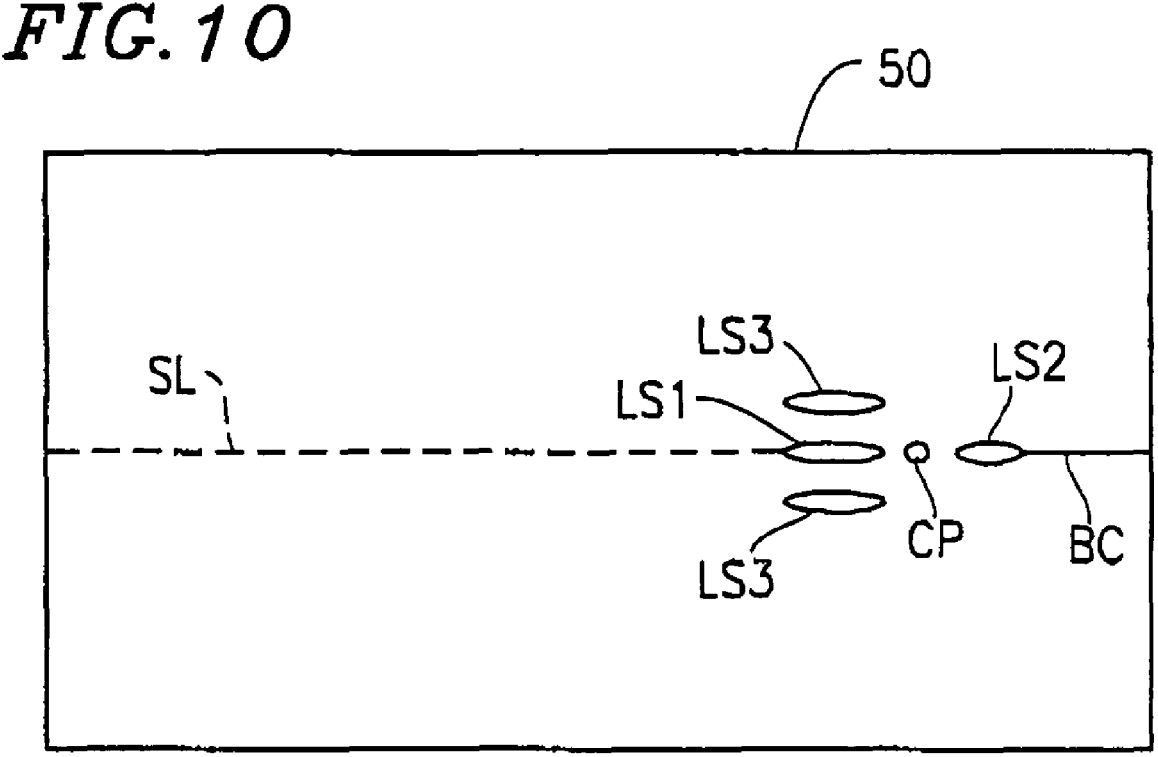

METHOD FOR SCRIBING SUBSTRATE OF BRITTLE MATERIAL AND SCRIBER

TECHNICAL FIELD

The present invention relates to a scribing method and a scribing apparatus for forming a scribe line on a surface of a substrate of a brittle material such as a glass substrate, a semiconductor wafer or the like used for a flat panel display (hereinafter, referred to as the "FPD") in order to scribe and break the brittle material substrate.

BACKGROUND ART

In this specification, formation of a scribe line on a mother glass substrate of a liquid crystal display panel, belonging to glass substrates, which is a type of brittle material substrates, will be described.

An FPD such as a liquid crystal display panel or the like, which includes a pair glass substrates assembled together, is produced as follows. A pair of large sized mother glass substrates are assembled together, and then each mother glass substrate is scribed and broken into glass substrates included in the FPD. For scribing and breaking each mother glass substrate, a scribe line is formed in advance by a cutter on each glass substrate.

Recently, a method using a laser beam for forming a scribe line on a surface of a mother glass substrate has been put into practice. According to a method using a laser beam for forming a scribe line on a surface of a mother glass substrate, as shown in FIG. 6, a laser beam LB is directed from a laser oscillator 61 toward a mother glass substrate 50. The laser beam LB directed from the laser oscillator 61 forms an elliptical laser spot LS along a predetermined line for forming a scribe line (hereinafter, referred to as a "a scribe line formation line") SL on the mother glass substrate 50. The mother glass substrate 50 and the laser beam LB directed from the laser oscillator 61 are moved with respect to each other along a longitudinal direction of the laser spot LS.

The mother glass substrate 50 is heated by the laser beam LB to a temperature which is lower than a softening temperature at which the mother glass substrate 50 is melted. Thus, a surface of the mother glass substrate 50 having the laser spot LS formed thereon is heated without being melted.

Toward an irradiation area irradiated with the laser beam LB and in the vicinity thereof on the surface of the mother glass substrate 50, a cooling medium such as, for example, cooling water can be sprayed from a cooling nozzle 62, so as to form a scribe line. On the surface of the mother glass substrate 50 irradiated with the laser beam LB, a compression stress is generated by the heating by the laser beam LB, and a tensile stress is generated by the cooling medium sprayed onto the surface. Thus, a tensile stress is generated in the vicinity of the area where the compression stress is generated. Therefore, a stress gradient is generated between the area having the compression stress and the area having the tensile stress, based on the respective stresses. On the mother glass substrate 50, a vertical crack is formed along the scribe line formation line SL from a notch TR which is formed in advance in an end area of the mother glass substrate 50.

FIG. 7 is a schematic projection showing an irradiation state of the laser beam LB on the mother glass substrate 50 which is scribed by a scribing apparatus. FIG. 8 is a plan view schematically showing a physical changing state of the mother glass substrate 50.

The laser beam LB oscillated from the laser oscillator 61 forms an elliptical laser spot LS on the surface of the mother glass substrate 50. The laser spot LS has an elliptical shape, for example, having a longer diameter b of 30.0 mm and a shorter diameter a of 1.0 mm. The laser beam LB is directed such that the longer axis thereof is along the scribe line formation line SL.

In this case, the laser spot LS formed on the mother glass substrate 50 has a higher thermal energy strength in an outer perimeter area thereof than that in a central portion thereof. Namely, each of the ends of the laser spot LS in the direction of the longer axis has the maximum energy strength. Such a distribution of thermal energy strength is obtained by converting a Gaussian distribution of thermal energy strength. Accordingly, the thermal energy strength is maximum at each of the ends in the direction of the longer axis which is located on the scribe line formation line SL. The thermal energy strength in the central portion of the laser spot LS interposed between the ends is lower than the thermal energy strength at each of the ends.

The mother glass substrate 50 can relatively move along the direction of the longer axis of the laser spot LS. Accordingly, the mother glass substrate 50 is first heated with a high thermal energy strength at one of the ends of the laser spot LS, next heated with a low thermal energy strength in the central portion of the laser spot LS, and then heated with a high thermal energy strength while moving along the scribe line formation line SL. After that, the cooling water from the cooling nozzle 62 is sprayed toward an area corresponding to an end of the laser spot LS, for example, a cooling point CP on the scribe line which is away from the end of the laser spot LS by a distance L of 0 to several millimeters.

Thus, a temperature gradient is generated between the laser spot LS and the cooling point CP. As a result, a large tensile stress is generated in an area opposite to the laser spot LS with the cooling point CP interposed therebetween. Utilizing this tensile strength, a vertical crack is generated in the mother glass substrate 50 in a thickness direction t from the notch TR formed at an end of the mother glass substrate 50 along the scribe line formation line.

The mother glass substrate 50 is heated by the elliptical laser spot LS. In this case, heat is conveyed in the vertical direction from the surface to the interior of the mother glass substrate 50, with a high thermal energy strength at one end of the laser spot LS. Since the laser spot LS moves relative to the mother glass substrate 50, a portion of the mother glass substrate 50 which is heated by a leading end of the laser spot LS is heated by the low thermal energy strength at the central portion of the laser spot LS and then again heated with a high thermal energy strength at a trailing end of the laser spot LS.

Thus, the surface of the mother glass substrate 50 is first heated with a high thermal energy strength, and while the surface of the mother glass substrate 50 is heated with a low thermal energy strength, the heat is conveyed to the interior thereof without fail. At this point, the surface of the mother glass substrate 50 is prevented from being continuously heated with a high thermal energy strength, which protects the surface of the mother glass substrate 50 from melting. After that, when the mother glass substrate 50 is heated again with a high thermal energy strength, the heat permeates into the interior of the mother glass substrate 50 without fail. Thus, a compression stress is generated on the surface and in the interior of the mother glass substrate 50. A tensile stress is generated by cooling water being sprayed toward the cooling point CP in the vicinity of the area in which the compression stress is generated.

When the compression stress is generated in the area heated by the laser spot LS and the tensile stress is generated at the cooling point CP by the cooling water, a large tensile stress is generated in an area opposite to the laser spot LS with the cooling point CP interposed therebetween. Such a tensile stress is generated by the compression stress generated in a thermal expansion area between the laser spot LS and the cooling point CP. Utilizing this tensile strength, a blind crack is generated from the notch TR formed at an end of the mother glass substrate 50 along the scribe line formation line.

When the blind crack acting as the scribe line is formed in the mother glass substrate 50, the mother glass substrate 50 is provided to the next breaking stage. In the breaking stage, a force is applied to both sides of the blind crack of the mother glass substrate 50 so as to generate a bending moment, which causes the blind crack to extend in the thickness direction of the mother glass substrate 50. Thus, the mother glass substrate 50 is scribed and broken along the blind crack formed along the scribe line formation line SL.

With such a scribing apparatus, it is necessary to increase the difference between the compression stress generated by the laser spot LS and the tensile stress at the cooling point CP, in order to form a vertical crack by a stress gradient between the heating by the laser spot LS formed on the surface of the mother glass substrate 50 and the cooling at the cooling point CP. In order to sufficiently perform the heating by the laser spot LS and the cooling by the cooling point CP, it is necessary to reduce the moving speed of the mother glass substrate relative to the laser spot LS and the cooling spot CP. As a result, a problem occurs in that the formation efficiency of the vertical crack is lowered.

In the case where an edge of the mother glass substrate 50, at which the heating by the laser spot LB along the scribe line formation line is started, is rapidly heated by an end of the laser spot LS, as shown in FIG. 9(a), there is an undesirable possibility that an uncontrollable crack CR is formed in the mother glass substrate 50 at a position ahead of the laser spot LS.

At the edge portion of the mother glass substrate 50, a stress remains when the mother glass substrate 50 is scribed and broken into a predetermined shape. The residual stress is released by the rapid heating by the laser spot LS, resulting in generation of the crack. The crack CR formed at a position ahead of the laser spot LS in this manner is uncontrollable and cannot be formed along the scribe line formation line.

Also in the case where an edge portion of the mother glass substrate 50, at which the heating by the laser spot LS is terminated after a blind crack BC is formed along the scribe line formation line, is rapidly heated by an end of the laser spot LS, as shown in FIG. 9(b), there is an undesirable possibility that an uncontrollable crack CR is formed from a side surface of the mother glass substrate 50 in a direction opposite to the moving direction of the laser spot LS. This crack CR is uncontrollable and cannot be formed along the scribe line formation line.

The present invention, made to solve these problems, has an object of providing a scribing method and a scribing apparatus for forming a scribe line on a brittle material substrate such as a mother glass substrate or the like, efficiently and without fail.

Another object of the present invention is to provide a scribing method and a scribing apparatus for scribing a brittle material substrate which can prevent formation of an uncontrollable crack at an edge portion of the brittle material substrate.

DISCLOSURE OF THE INVENTION

In a scribing method for a brittle material substrate according to the present invention, the brittle material substrate is continuously heated by a first laser spot to a temperature which is lower than a softening point of the brittle material substrate, along a scribe line formation line on a surface of the brittle material substrate, along which a scribe line is to be formed, while an area close to the first laser spot is continuously cooled along the scribe line formation line; and an area which is close to the cooled area and is on an opposite side to the first laser spot is continuously heated by a second laser spot along the scribe line formation line to a temperature which is lower than the softening point of the brittle material substrate.

The cooled area is longer along the scribe line formation line.

Both sides of the scribe line formation line at an edge portion of the brittle material substrate are preheated immediately before being heated by the first laser spot.

Both sides of the scribe line formation line at an edge portion of the brittle material substrate are preheated while being heated by the first laser spot simultaneously.

A scribing apparatus for a brittle material substrate according to the present invention is for forming a crack in a surface of the brittle material substrate, along which a scribe line is to be formed. The scribing apparatus includes means for continuously irradiating the brittle material substrate with a laser beam so as to form a first laser spot, such that an area heated by the first laser spot is heated to a temperature lower than a softening point of the brittle material substrate; means for continuously cooling an area close to the area heated by the first laser spot along the scribe line formation line; and means for continuously irradiating, with a second laser spot, an area which is close to the cooled area and is on an opposite side to the first laser spot, along the scribe line formation line, such that the area is heated to a temperature lower than the softening point of the brittle material substrate.

BRIEF DESCRIPTION OF THE DRAWINGS

FIG. 10 is a schematic plan view showing another exemplary embodiment of a scribing method according to the present invention.

BEST MODE FOR CARRYING OUT THE INVENTION

Hereinafter, the present invention will be described by way of examples with reference to the attached drawings.

Figure 1:
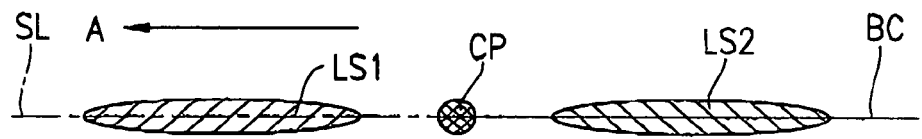
FIG. 1 is a schematic plan view showing one exemplary embodiment of a scribing method according to the present invention.

A scribing method for a brittle material substrate according to the present invention is carried out for example, to form a blind crack, which is to be a scribe line, on a mother glass substrate before the mother glass substrate is broken into a plurality of glass substrates included in an FPD such as a liquid crystal panel or the like. FIG. 1 is a schematic view of a state of a surface of the mother glass substrate when the scribing method is carried out.

As shown in FIG. 1, the surface of the mother glass substrate is irradiated with a laser beam, and thus a first laser spot LS1 is formed on the surface along a scribe line formation line SL. At one end of the scribe line formation line SL on the surface of the mother glass substrate, a notch is formed in the direction of the scribe line formation line SL.

The first laser spot LS1 has an elliptical shape, for example, having a longer diameter of 30.0 mm and a shorter diameter of 1.0 mm, and moves in a direction represented by arrow A relative to the surface of the mother glass substrate, in the state where a longer axis thereof is along the scribe line formation line SL.

Along the longer axis of the first laser spot LS1 formed on the surface of the mother glass substrate, the thermal energy strength is distributed as follows; the thermal energy strength is maximum at each of the ends in the direction of the longer axis, and the thermal energy strength is lower in an intermediate portion between the ends. The elliptical first laser spot LS1 moves along the scribe line formation line SL on the surface of the mother glass substrate, and sequentially heats the scribe line formation line SL.

The first laser spot LS1 heats the mother glass substrate at a temperature which is lower than a softening point at which the mother glass substrate is melted. Thus, the surface of the mother glass substrate having the laser spot LS1 formed thereon is heated without being melted.

On the surface of the mother glass substrate, a small circular cooling point CP is formed on the scribe line formation line SL at a position behind but close to the first laser spot LS1, the position being behind the cooling point CP in the advancing direction of the first laser spot LS1. The cooling point CP is formed by a cooling medium such as, for example, cooling water, compressed air, a mixed fluid of water and compressed air, He gas, $N_2$ gas, or $CO_2$ gas, which is sprayed from a cooling nozzle toward the surface of the mother glass substrate. The cooling point CP is moved along the scribe line formation line SL on the surface of the mother glass substrate, in the same direction and at substantially the same speed as those of the first laser spot LS1 with respect to the mother glass substrate.

On the surface of the mother glass substrate, a circular or elliptical second laser spot LS2 extending along the scribe line formation line, at a position behind but close to the cooling point CP, the position being behind the cooling point CP in the advancing direction of the cooling point CP.

In this example, the second laser spot is elliptical.

The second laser spot LS2 has an elliptical shape, for example, having a longer diameter of 30.0 mm and a shorter diameter of 1.0 mm like the first laser spot LS1. The second laser spot LS2 moves relative to the mother glass substrate, in the same direction and at substantially the same speed as those of the first laser spot LS1 and the cooling spot CP with respect to the mother glass substrate. The second laser spot LS2 moves in the state where a longer axis thereof is along the scribe line formation line SL.

Along the longer axis of the second laser spot LS2, the thermal energy strength is distributed as follows like in the case of the first laser spot LS1: the thermal energy strength is maximum at each of the ends in the direction of the longer axis, and the thermal energy strength is lower in an intermediate portion between the ends.

The second laser spot LS2 heats the mother glass substrate at a temperature which is lower than the temperature at which the mother glass substrate is melted, i.e., the softening point of the mother glass substrate, while moving relative to the mother glass substrate at a high speed.

The surface of the mother glass substrate is sequentially heated by the first laser spot LS1 along the scribe line formation line SL, and then the heated portions are sequentially cooled by the cooling point CP. Then, the cooled portions are sequentially heated by the second laser spot LS2.

Thus, a compression stress is generated by heating with the maximum thermal energy strength at a trailing end of the first laser spot LS1, and a tensile stress is generated when the heated portion is cooled by the cooling point CP. A stress gradient is generated between the first laser spot LS1 and the cooling point CP.

By the generation of the stress gradient between the first laser spot LS1 and the cooling point CP, a blind crack in the vertical direction is generated in the mother glass substrate along the scribe line formation line SL.

When the blind crack in the vertical direction is generated along the scribe line formation line SL, the area having the blind crack formed therein is again heated by the second laser spot LS2. Thus, the vertical crack formed in the mother glass substrate further extends in the vertical direction and reaches the bottom of the brittle material substrate (the "full body cut" of the brittle material substrate).

Figure 2:
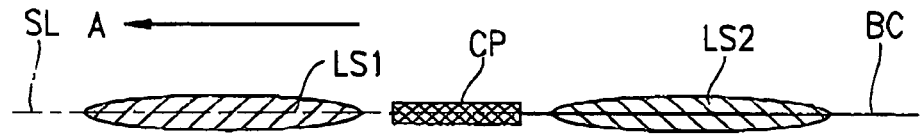
FIG. 2 is a schematic plan view showing another exemplary embodiment of a scribing method according to the present invention.

The cooling point CP provided between the first laser spot LS1 and the second laser spot L82 is not limited to being circular, and may have a rectangular shape which is longer along the scribe line formation line SL as shown in FIG. 2. By the cooling point CP being longer along the scribe line formation line SL, the area heated by the first laser spot LS1 is cooled without fall.

The cooling point CP extending along the scribe line formation line SL is formed by forming the spraying hole of the cooling nozzle through which the cooling medium is sprayed to be rectangular, or by linearly providing small circular spraying holes of the cooling nozzle along the scribe line formation line SL.

Figure 3:
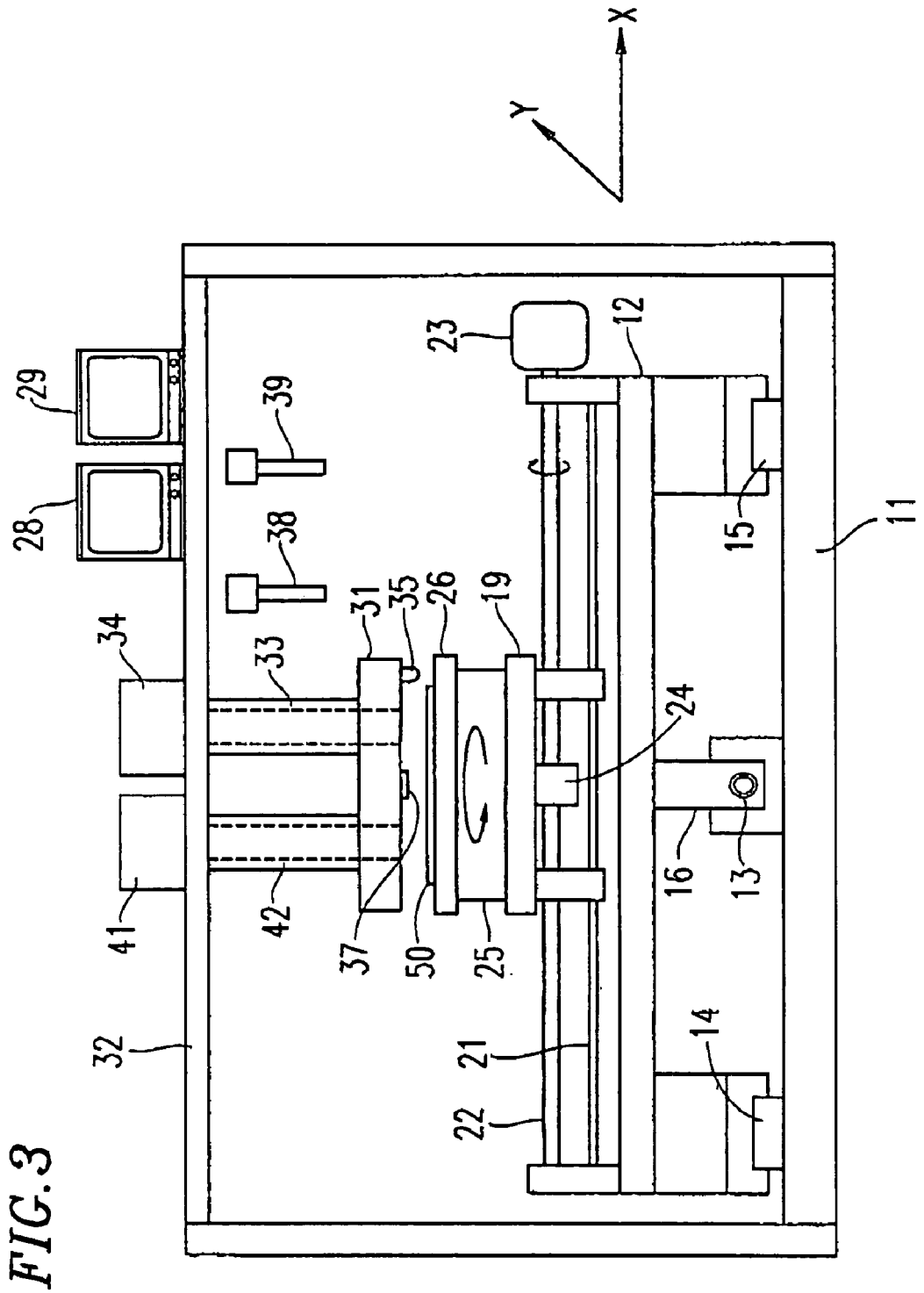
FIG. 3 is a front view showing one exemplary embodiment of a scribing apparatus according to the present invention.

FIG. 3 is a schematic structural view showing an embodiment of a scribing apparatus for a brittle material substrate according to the present invention. The scribing apparatus according to the present invention forms, for example, a scribe line for scribing and breaking a large-sized mother glass substrate into glass substrates used for FPDs. As shown in FIG. 3, this scribing apparatus has a slidable table 12 on a horizontal base 11. The slidable table 12 is reciprocally movable in a prescribed horizontal direction (Y direction).

The slidable table 12 is supported by a pair of guide rails 14 and 15 so as to be horizontally slidable along the guide rails 14 and 15. The guide rails 14 and 15 are provided on an upper surface of the base 11 and extend in the Y direction, parallel to each other. At a central position between the guide rails 14 and 15, a ball screw 13 parallel to the guide rails 14 and 15 is provided so as to be rotated by a motor (not shown). The ball screw 13 is rotatable both forward and backward. A ball nut 16 is engaged with the ball screw 13. The ball nut 16 is integrally provided to the slidable table 12 so as not to rotate. When the ball screw 13 rotates forward and backward, the ball nut 16 is moved along the ball screw 13 in both directions along the Y direction. Thus, the slidable table 12 integral with the ball nut 16 slides in both directions along the guide rails 14 and 15 in the Y direction.

A pedestal 19 is horizontally provided on the slidable table 12. The pedestal 19 is slidably supported by a pair of guide rails 21, which are provided above the slidable table 12. The pair of guide rails 21 extend in an X direction perpendicular to the Y direction, and are parallel to each other. At a central position between the guide rails 21, a ball screw 22 parallel to the guide rails 21 is provided. The ball screw 22 is rotatable forward and backward by a motor 23.

A ball nut 24 is engaged with the ball screw 22. The ball nut 24 is integrally provided to the pedestal 19 so as not to rotate. When the ball screw 22 rotates forward and backward, the ball nut 24 is moved along the ball screw 22 in both directions along the X direction. Thus, the pedestal 19 slides along the guide rails 21 in both directions along the X direction.

A rotation mechanism 25 is attached to pedestal 19. On the rotation mechanism 25, a rotatable table 26 is horizontally provided. On the rotatable table 26, the mother glass substrate 50, which is to be scribed, is to be placed. The rotation mechanism 25 is structured to rotate the rotatable table 26 about a vertical central axis of the rotation mechanism 25. The rotation mechanism 25 can rotate the rotatable table 26 to an arbitrary rotation angle θ with respect to a reference position. On the rotatable table 26, the mother glass substrate 50 is secured by, for example, a suction chuck.

Above the rotatable table 26, a support table 31 is provided at an appropriate distance from the rotatable table 26. The support table 31 is horizontally supported at a lower end of a first optical holder 33. The first optical holder 33 is vertically provided. An upper end of the first optical holder 33 is attached to a lower surface of an attachment table 32, which is provided on the base 11. On the attachment table 32, a first laser oscillator 34 for oscillating a first laser beam is provided. An optical system held inside the first optical holder 33 is irradiated with the laser beam oscillated by the first laser oscillator 34.

The laser beam oscillated by the first laser oscillator 34 has a Gaussian distribution of thermal energy strength, and is directed by the optical system provided in the first optical holder 33, such that the elliptical first laser spot LS1 having a predetermined distribution of thermal energy strength is formed on the surface of the mother glass substrate 50 and such that the direction of the longer axis of the first laser spot LS1 is parallel to the X direction of the mother glass substrate 50 placed on the rotatable table 26.

On the attachment table 32, a second laser oscillator 41 for oscillating a second laser beam is provided adjacent to the first laser oscillator 34. An optical system in a second optical holder 42 provided adjacent to the first optical holder 33 on the support table 31 is irradiated with a laser beam oscillated from the second oscillator 41. The laser beam oscillated from the second laser oscillator 41 has a Gaussian distribution of thermal energy strength, and is directed by the optical system provided in the second optical holder 42, so as to form the elliptical second laser spot LS2 having a prescribed distribution of thermal energy strength on the surface of the glass substrate 50. The laser beam is directed in the state where the direction of the longer axis of the second laser spot LS2 is along the X direction of the mother glass substrate 50 placed on the rotatable table 26 and has an appropriate distance from the first laser spot LS1.

A cooling nozzle 37 is provided on the support table 31 between the first optical holder 33 and the second optical holder 42. The cooling nozzle 37 faces the mother glass substrate 50 placed on the rotatable table 26. The cooling nozzle 37 is for spraying a cooling medium such as cooling water or the like such that the cooling medium forms a rectangular shape between the first laser spot LS1 formed by the first optical holder 33 and the second laser spot LS2 formed by the first optical holder 42, along the longer axis of the first laser spot LS1 and the second laser spot LS2.

As the cooling nozzle 37, a plurality of nozzles for spraying cooling water toward a small circular area may be arranged in the X direction, instead of a structure for spraying the cooling water to form a rectangular area.

The support table 31 is also provided with a cutter wheel chip 35 opposite to the cooling nozzle 37 with the first laser spot LS1 formed by the first optical holder interposed therebetween. The cutter wheel chip 35 faces the mother glass substrate 50 on the rotatable tale 26. The cutter wheel chip 35 is provided in the direction of the longer axis of the first laser spot LS1 formed by the first optical holder 33. The cutter wheel chip 35 is provided for making a notch in an edge portion of the mother glass substrate 50 placed on the rotatable table 26 along the scribe line formation line.

Positioning of the slidable table 12 and the pedestal 19, and control of the rotation mechanism 25, the first laser oscillator 34, the second laser oscillator 41 and the like are performed by a control section.

The scribing apparatus having the above-described structure forms a blind crack as follows. First, information, including the size of the mother glass substrate 50 and the position of the scribe line formation line, at which the scribe line is to be formed, is input to the control section.

Then, the mother glass substrate 50 is placed on the rotatable table 26 and secured by the suction means. In this state, alignment marks provided on the mother glass substrate 50 are imaged by CCD cameras 38 and 39. The imaged alignment marks are displayed by monitors 28 and 29, and positional information of the alignment marks is processed by an image processing device.

When the rotatable table 26 is positioned with respect to the support table 31, the rotatable table 26 is slid in the X direction. Thus, the scribe line formation line at an edge portion of the mother glass substrate 50 faces the cutter wheel chip 35. The cutter wheel chip 35 is lowered, and a notch is formed at one end of the scribe line formation line of the mother glass substrate 50.

Then, while the rotation table 26 is slid in the X direction along the scribe line formation line, the first laser beam and the second laser beam are oscillated respectively from the first laser oscillator 34 and the second laser oscillator 41, and the cooling water is sprayed together with compressed air from the cooling nozzle 37. Thus, a rectangular cooling point extending along the scribe line formation line is formed.

The laser beam oscillated from the first laser oscillator 34 forms the elliptical first laser spot LS1 on the mother glass substrate, which is longer along the scanning direction of the mother glass substrate 50, i.e., in the X direction. Behind the laser spot LS1, the cooling point CP is formed by the sprayed cooling water along the scribe line formation line. The laser beam oscillated from the second laser oscillator 41 forms, on the mother glass substrate 50, the elliptical second laser spot LS2 which is longer in the X direction behind the cooling point CP.

Owing to the stress gradient between the heating by the first laser spot LS1 and the cooling by the cooling point CP, a blind crack is formed on the mother glass substrate 50. An area close to the cooling point CP to which the cooling water is sprayed is heated by the second laser spot LS2, and thus the blind crack which has already been formed is further extended deeper toward a rear surface of the mother glass substrate 50.

When the blind crack is formed on the mother glass substrate 50, the mother glass substrate 50 is supplied to the next breaking stage. In the breaking stage, a force is applied to the mother glass substrate 50 such that a bending moment acts across the blind crack. Thus, the mother glass substrate 50 is scribed and broken along the blind crack.

Figure 4:
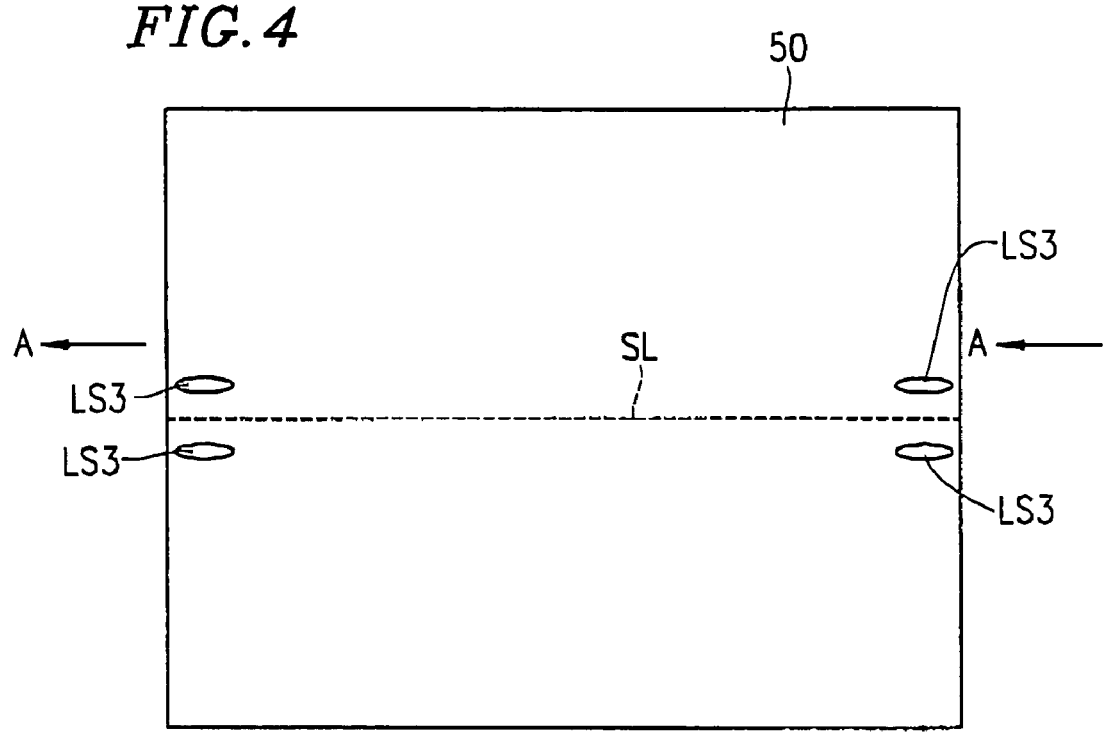
FIG. 4 is a schematic plan view showing another exemplary embodiment of a scribing apparatus according to the present invention.

As shown in FIG. 4, immediately before an edge portion of the mother glass substrate 50 is irradiated with the first laser spot LS1, each side of the scribe line formation line may be irradiated and heated with a preheating laser spot LS3. In the case where immediately before the scribe line formation line is irradiated with the first laser spot LS1, both sides of the scribe line formation line at an edge portion of the mother glass substrate 50 are heated by the preheating laser spot LS3, the stresses remaining at both sides of the edge portion of the scribe line formation line become substantially the same as each other. Accordingly, even though the edge portion of the mother glass substrate 50 is irradiated with the first laser spot LS1 afterwards, formation of a crack from a side surface of the mother glass substrate 50 to a position ahead of the first laser spot LS1 in the moving direction of the first laser spot LS1 is prevented.

Similarly, immediately before the first laser spot LS1 irradiating the mother glass substrate 50 reaches the other edge portion of the mother glass substrate 50, each side of the scribe line formation line may be heated by irradiation of the preheating laser spot LS3. In the case where immediately before the first laser spot LS1 reaches the edge portion of the mother glass substrate 50, both sides of the scribe line formation line at the edge portion of the mother glass substrate 50 are heated by the preheating laser spot LS3, the stresses remaining at both sides of the edge portion of the scribe line formation line become substantially the same as each other. Accordingly, even though the edge portion of the mother glass substrate 50 is irradiated with the first laser spot LS1 afterwards, formation of a crack from a side surface of the mother glass substrate 50 to a position ahead of the first laser spot LS1 in the moving direction of the first laser spot LS1 is prevented.

The present invention is not limited to the structure in which the mother glass substrate 50 is irradiated with a pair of preheating laser spots LS3 immediately before the first laser spot LS1 is directed to the mother glass substrate 50 or immediately before the first laser spot LS1 reaches the opposite edge portion of the mother glass substrate 50. Alternatively, the mother glass substrate 50 may be continuously irradiated with the pair of preheating laser spot LS3 at a position ahead of the first laser spots LS1.

As shown in FIG. 10, the mother glass substrate 50 may be irradiated with the pair of preheating laser spots LS3 such that the pair of preheating laser spots LS3 are on both sides and parallel to the first laser spot LS1.

Figure 5:
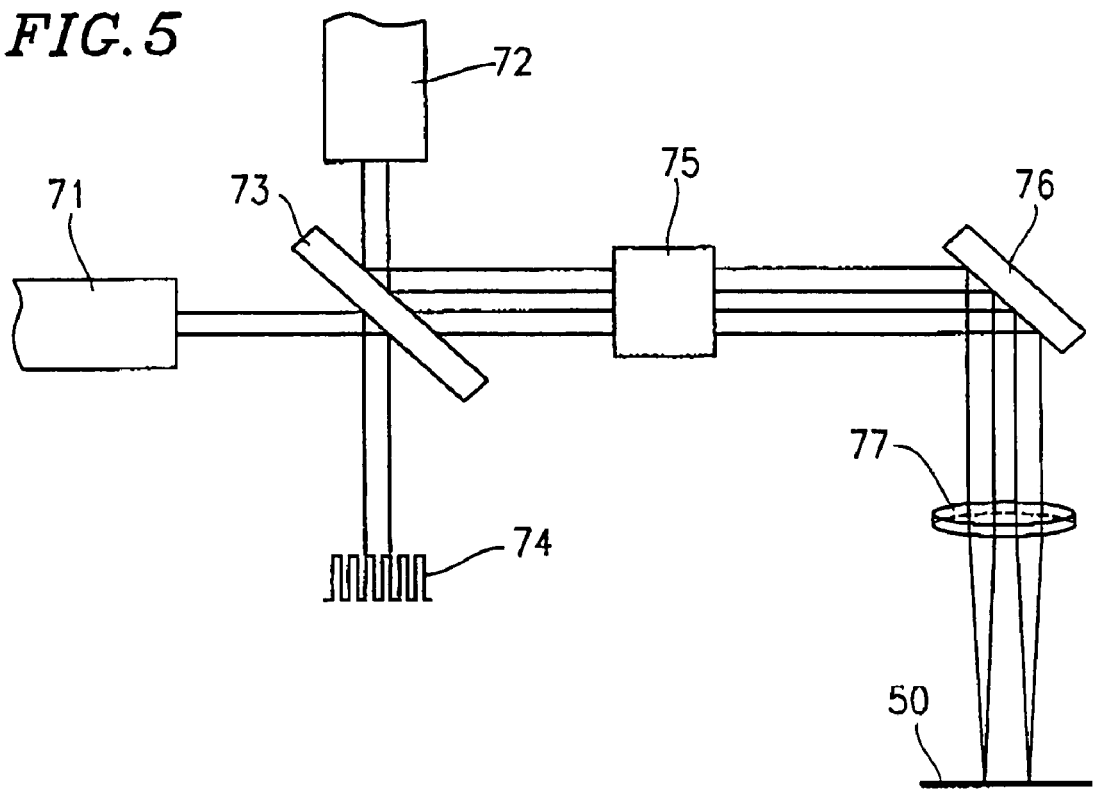
FIG. 5 is a schematic structural view showing an example of a laser oscillation mechanism used for the scribing apparatus according to the present invention.
Figure 6:
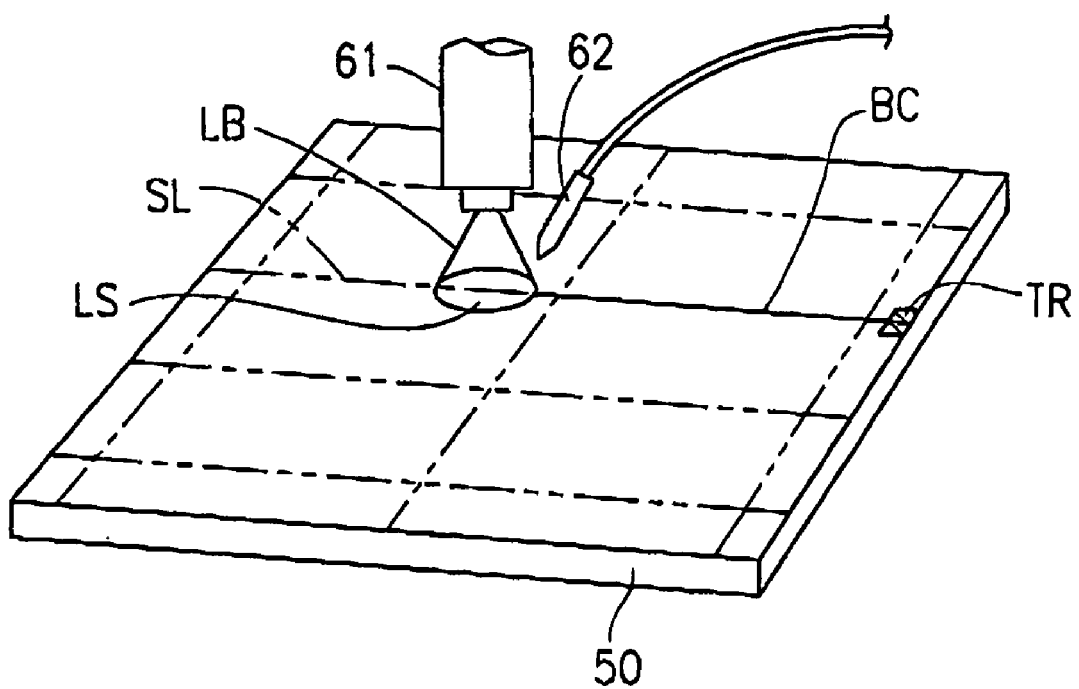
FIG. 6 is a schematic view illustrating a scribing method using a laser beam.
Figure 7:
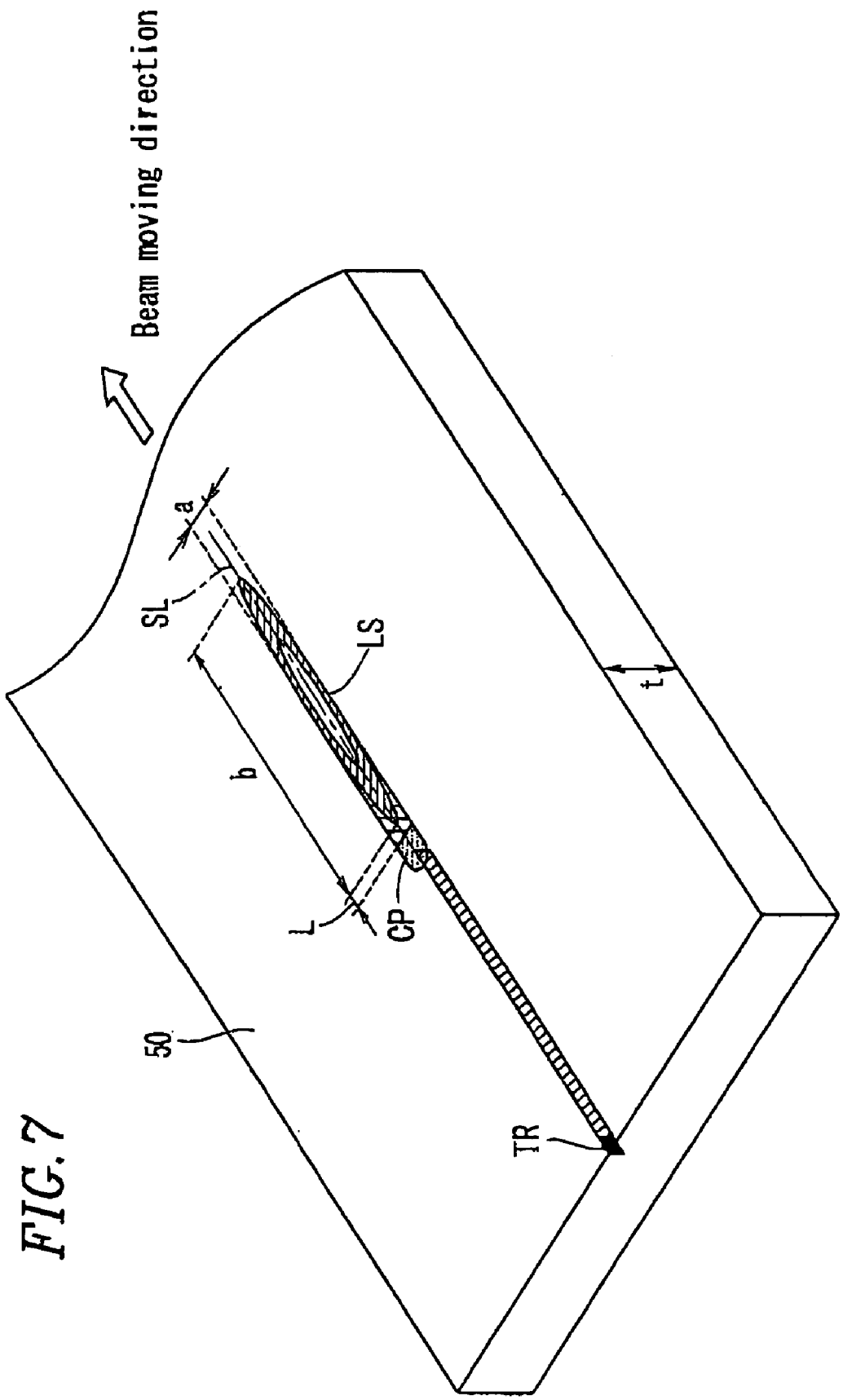
FIG. 7 is a projection schematically showing a state of a mother glass substrate while a scribe line is being formed by the scribing apparatus.
Figure 8:
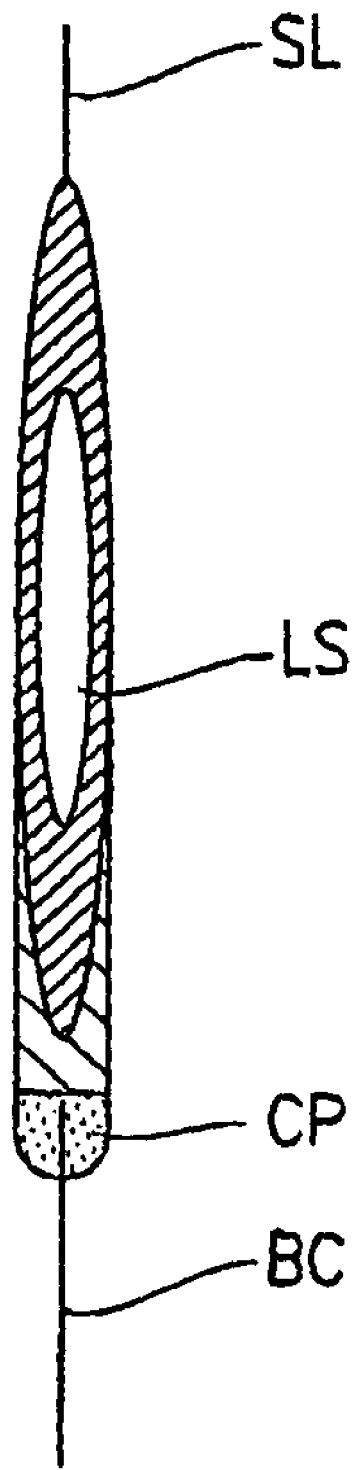
FIG. 8 is a plan view schematically showing a state of the mother glass substrate.
Figure 9A:
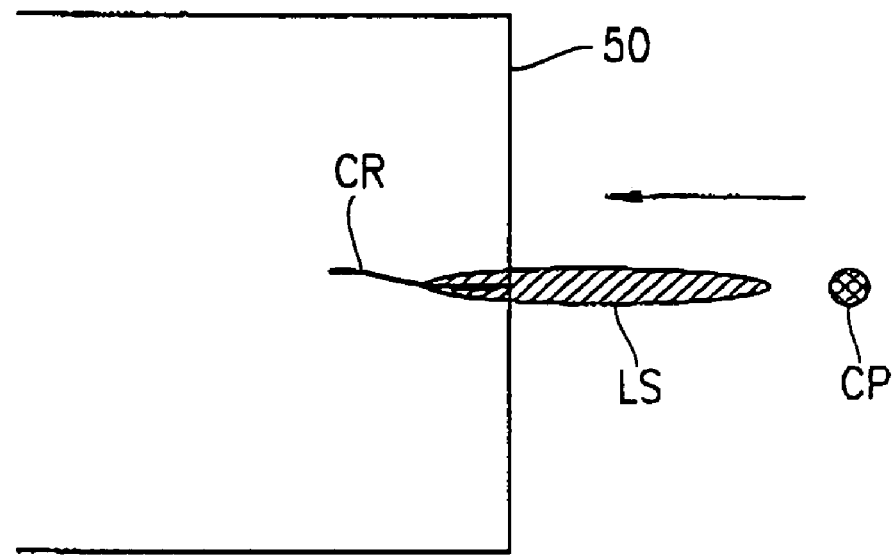
FIGS. 9(a) and 9(b) are each a plan view schematically showing a state of generation of an uncontrollable crack at an edge portion of the mother glass substrate.
Figure 9B:
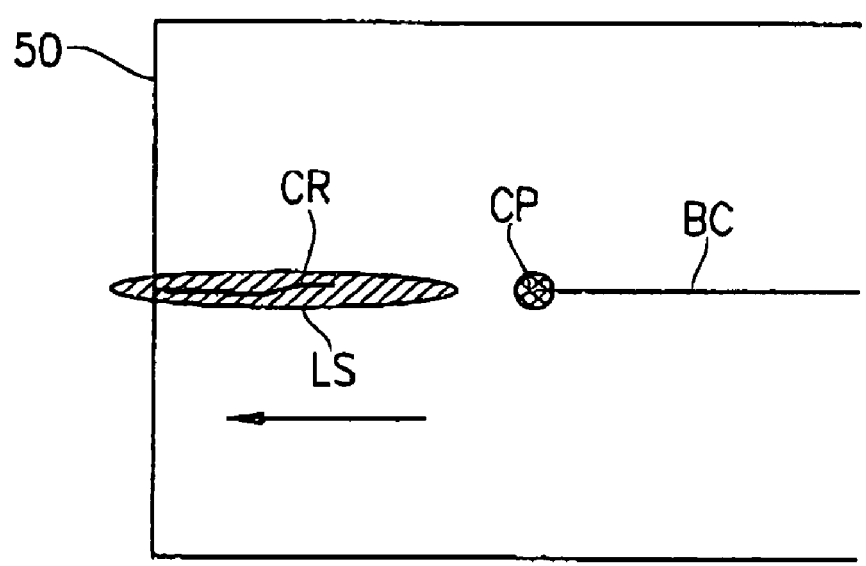

FIG. 5 is a schematic structural view of a laser irradiation mechanism for forming a pair of preheating laser spots LS3. In this laser irradiation mechanism, a pair of preheating laser oscillators 71 and 72 each oscillate a laser beam. The first preheating laser oscillator 71 directs the laser beam in a horizontal direction, and the second preheating laser oscillator 72 directs the laser beam downward in a vertical direction.

The laser beam oscillated from each of the pair of preheating laser oscillators 71 and 72 is supplied to a shutter 73 which is inclined at 45 degrees with respect to the horizontal direction. The shutter 73, when in a light transmissive state, allows a laser beam directed from the first preheating laser oscillator 71 in the horizontal direction to transmit therethrough in the horizontal direction. In a light shutting state, the shutter 73 reflects, downward in the vertical direction, a laser beam directed from the first preheating laser oscillator 71 which is in the horizontal direction.

The shutter 73, when in the light transmissive state, allows a laser beam directed downward from the second preheating laser oscillator 72 to transmit therethrough in the vertical direction. In the light shutting state, the shutter 73 reflects a laser beam directed downward from the second preheating laser oscillator 72 into the horizontal direction.

Below the shutter 73, a cooling plate 74 is provided. The cooling plate 74 is irradiated with the laser beam emitted from the first preheating laser oscillator 71 and reflected downward by the shutter 73 and also with the laser beam emitted from the second preheating laser oscillator 72 and transmitted through the shutter 73.

The laser beam emitted from the first preheating laser oscillator 71 and transmitted through the shutter 73 in the horizontal direction, and the laser beam emitted from the second preheating laser oscillator 72 and reflected by the shutter 73 in the horizontal direction, are directed to a twin-spot system lens 75. The lens 75 supplies the pair of laser beams directed thereto to a reflective mirror 76 as parallel optical fluxes. Each optical flux supplied to the reflective mirror 76 is reflected by the reflective mirror 76 and directed to a collection lens 77. The collection lens 77 forms a laser spot having a prescribed shape on both sides of the scribe line formation line on the surface of the mother glass substrate 50.

Where the light transmissive state is "ON" and the light shutting state is "OFF", the shutter 73 is switched "ON" or "OFF" at a high speed.

Such a laser irradiation mechanism is located in the scribing apparatus shown in FIG. 3, at a position opposite to the second optical holder 42 with the first optical holder 33 interposed therebetween. On both sides of the scribe line formation line at an edge portion of the mother glass substrate 50, preheating laser spots LS3 are formed respectively by a pair of laser beams provided by the laser irradiation mechanism.

In this specification, a mother glass substrate of a liquid crystal display panel is described as an example of a brittle material substrate. The present invention provides the same effect in scribing glass substrates assembled together, a single glass substrate, a semiconductor wafer, a ceramic substrate and the like.

The scribing method and the scribing apparatus according to the present invention are applicable to scribing of a mother substrate such as a liquid crystal display substrate obtained by assembling glass substrates, a transmissive projector substrate, an organic EL element, a PDP (plasma display panel), an FED (field emission display), a reflective projector substrate obtained by assembling a glass substrate and a silicon substrate, and the like.

INDUSTRIAL APPLICABILITY

As described above, according to a scribing method and a scribing apparatus for a brittle material substrate of the present invention, a surface of the brittle material substrate such as a mother glass substrate or the like is heated by a first laser spot, then cooled, and then again heated by a second laser spot. Therefore, a blind crack deep in the vertical direction can be formed without fail.

Since an edge portion of the brittle material substrate is preheated immediately before being heated by the first laser spot, there is no undesirable possibility that an uncontrollable crack is formed.

The invention claimed is:

1. A scribing method for a brittle material substrate, wherein the brittle material substrate is continuously heated by a first laser spot to a temperature which is lower than a softening point of the brittle material substrate, along a scribe line formation line on a surface of the brittle material substrate, along which a scribe line is to be formed, while an area close to the first laser spot is continuously cooled along the scribe line formation line; and an area which is close to the cooled area and is on an opposite side to the first laser spot is continuously heated by a second laser spot along the scribe line formation line to a temperature which is lower than the softening point of the brittle material substrate, wherein both sides of the scribe line formation line at an edge portion of the brittle material substrate are preheated with separate preheating spots spaced apart from and on opposite sides of the scribe line immediately before being heated by the first laser spot.

2. A scribing method for a brittle material substrate according to claim 1, wherein the cooled area is extended longer along the scribe line formation line.

3. A scribing method for a brittle material substrate, wherein the brittle material substrate is continuously heated by a first laser spot to a temperature which is lower than a softening point of the brittle material substrate, along a scribe line formation line on a surface of the brittle material substrate, along which a scribe line is to be formed, while an area close to the first laser spot is continuously cooled along the scribe line formation line; and an area which is close to the cooled area and is on an opposite side to the first laser spot is continuously heated by a second laser spot along the scribe line formation line to a temperature which is lower than the softening of the brittle material substrate, wherein both sides of the scribe line formation line at an edge portion of the brittle material substrate are preheated by separate preheating spots spaced apart from and on opposite sides of the scribe line while being heated by the first laser spot simultaneously.

4. A scribing method for a brittle material substrate according to claim 3, wherein the cooled area is extended longer along the scribe line formation line.

5. A scribing apparatus for a brittle material substrate, comprising:

heating means for continuously irradiating the brittle material substrate having a scribe line formation line, along which a scribe line is to be formed, with a first laser beam so as to form a first laser spot, and heating the brittle material substrate to a temperature which is lower than a softening point of the brittle material substrate;

cooling means for continuously cooling an area close to an area heated by the first laser spot along the scribe line formation line; and heating means for continuously irradiating an area which is close to the cooled area and is on an opposite side to the first laser spot with a second laser beam along the scribe line formation line so as to form a second laser spot, and heating the brittle material substrate to a temperature which is lower than the softening point of the brittle material substrate, wherein a vertical crack is formed along the scribe line formation line, the scribing apparatus comprising means for preheating the brittle material substrate at an edge portion of the brittle material substrate by forming a pair of separate preheated spots spaced apart from the scribe line and on both sides of the scribe line formation line of the brittle material substrate.

6. A scribing apparatus for a brittle material substrate according to claim 5, wherein the cooling means has a structure for spraying a cooling medium such that cooling medium forms a rectangular shape along the scribe line formation line.

7. A scribing apparatus for a brittle material substrate according to claim 5, wherein the cooling means has a plurality of cooling nozzles arranged along the scribe line formation line, and each cooling nozzle sprays a cooling medium such that the cooling medium forms a circular area.

8. A scribing apparatus for a brittle material substrate according to claim 5, wherein the preheating means preheats both sides of the scribe line formation line at an edge portion of the brittle material substrate immediately before heating by the first laser spot.

9. A scribing apparatus for a brittle material substrate according to claim 5, wherein the preheating means preheats both sides of the scribe line formation line at an edge portion of the brittle material substrate while being heated by the first laser spot simultaneously.

* * * * *